No. 707,502. Patented Aug. 19, 1902.
T. E. COLLINS.
PEDESTAL FOR LOCOMOTIVES.
(Application filed Dec. 13, 1900.)
(No Model.)
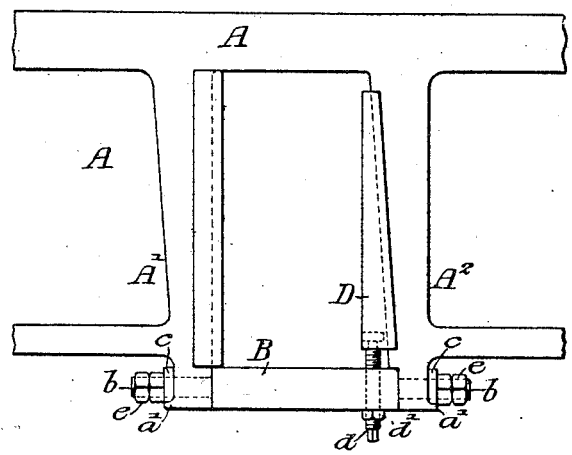
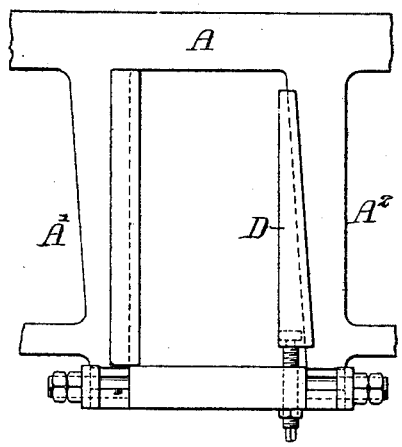
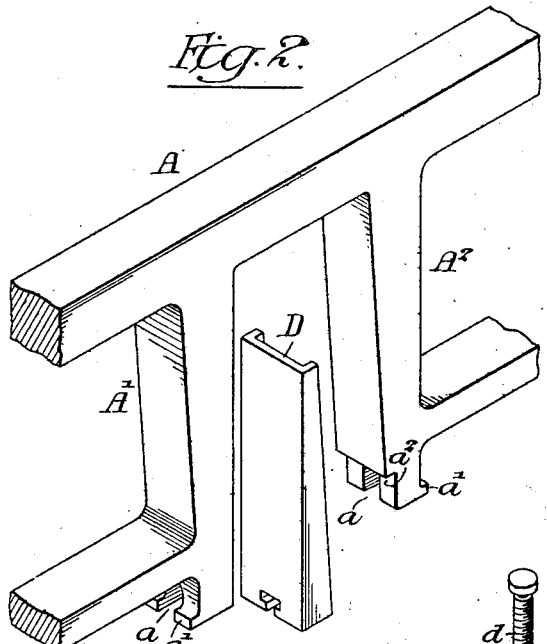
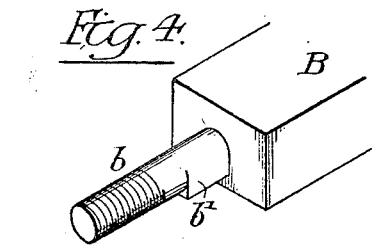
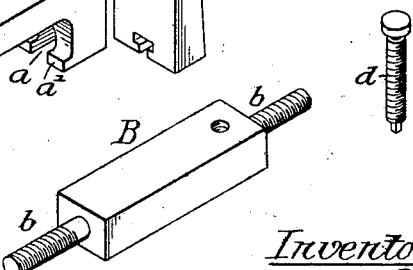
Witnesses:—
Inventor:—
Thomas Earl Collins
by his Attorneys:—
Howson & Howson

UNITED STATES PATENT OFFICE.

THOMAS EARL COLLINS, OF PHILADELPHIA, PENNSYLVANIA, ASSIGNOR TO GEORGE BURNHAM, WILLIAM P. HENSZEY, JOHN H. CONVERSE, WILLIAM L. AUSTIN, SAMUEL M. VAUCLAIN, ALBA B. JOHNSON, AND GEORGE BURNHAM, JR., DOING BUSINESS UNDER FIRM-NAME OF BURNHAM, WILLIAMS AND COMPANY, OF PHILADELPHIA, PENNSYLVANIA.

PEDESTAL FOR LOCOMOTIVES.

SPECIFICATION forming part of Letters Patent No. 707,502, dated August 19, 1902.

Application filed December 13, 1900. Serial No. 39,754. (No model.)

*To all whom it may concern:*

Be it known that I, THOMAS EARL COLLINS, a citizen of the United States, residing in Philadelphia, Pennsylvania, have invented certain Improvements in Pedestals for Locomotives, &c., of which the following is a specification.

The object of my invention is to so design the pedestal of a locomotive-frame that the box can be readily removed from the pedestal, and at the same time means for adjusting the box can be carried by the cross-bar, as fully described hereinafter, reference being had to the accompanying drawings, in which—

Figure 1 is a side view of sufficient of a locomotive-frame to illustrate my invention. Fig. 2 is a detached perspective view of the parts, and Figs. 3 and 4 are views of modifications of the invention.

A is the frame of the locomotive.

$A'$ $A^2$ are the two side members of the pedestal, and B is the cross-bar tying the two side members $A'$ $A^2$ together. The lower portion of each side member $A'$ $A^2$ has a slot $a$, as clearly shown in the perspective view, and the bar B has extensions $b$ $b$, which are screw-threaded. These extensions are integral with the bar, and they fit in the slots $a$ $a$, as shown in Fig. 1. Lips $a'$ are provided on each pedestal, and the washers $c$ $c$ rest on these lips when the nuts $e$ $e$ are screwed up in place, so that the bar B is supported by the lips, and the lower portions of the pedestals are held from spreading by the nuts. This construction allows for the passage of a vertical adjusting-screw $d$, which extends through a threaded opening in the bar B and is connected to a wedge D, fitting the inclined surface of the side member $A^2$ of the pedestal. The screw is provided with a jam-nut $d'$, as shown. One of the side members, $A^2$, is preferably notched at $a^2$ for the reception of the end of the bar B. Thus a shoulder is formed which prevents the bar from turning, or one or both of the extensions $b$ may have a portion shaped as shown in Fig. 4, which will prevent the bar B from turning.

Prior to my invention the lower portions of the pedestal were secured together by a tie-rod passing through a spacing-block between the pedestals; but this necessitated the use of a long rod, at the same time preventing the use of a central adjusting-screw for the wedge. By my construction, in which the bar and the screw-stem are integral and the ends of the pedestal are slotted, I provide a construction which can be readily applied or detached and which will give sufficient room for the adjusting-screw to take up the wear in the boxes.

While I have shown nuts mounted on a screw-threaded extension, it will be understood that other means of fastening may be resorted to without departing from my invention.

In some instances the slots may be in the side of the members $A'$ $A^2$, as shown in Fig. 3, and the washer may be flanged, so as to fit over the edge of the side members, if necessary.

The screw-threaded extensions are shown as integral with the spacing-bar; but they may be in the form of stud-bolts screwed into each end of the bar.

I claim as my invention—

1. The combination of a pedestal having side members provided with slots in their lower ends, a cross-bar mounted between said members having threaded extensions constructed to enter said slots, nuts for said threaded extensions, a wedge mounted on one of the pedestals, and a screw in movable engagement with said wedge, passing through a threaded opening in said cross-bar, said screw having an irregular head whereby it may be turned, substantially as described.

2. The combination of a pedestal, side members having slots in their lower ends, a cross-bar mounted between said side members having screw-threaded extensions for engaging said slots, nuts and washers on the extensions whereby said cross-bar is retained in position, one of said extensions being shaped to
5 fit the slot in one of the side members, so as to prevent the turning of the cross-bar, substantially as described.

In testimony whereof I have signed my name to this specification in the presence of two subscribing witnesses.

THOMAS EARL COLLINS.

Witnesses:
 KENNETH RUSHTON,
 WM. A. AUSTIN.